C. G. WAY.

Funnels.

No. 135,391. Patented Jan. 28, 1873.

UNITED STATES PATENT OFFICE.

CHARLES G. WAY, OF BOSTON, MASSACHUSETTS.

IMPROVEMENT IN FUNNELS.

Specification forming part of Letters Patent No. 135,391, dated January 28, 1873.

*To all whom it may concern:*

Be it known that I, CHARLES G. WAY, of Boston, Suffolk county, State of Massachusetts, have invented a new and Improved Funnel; and that the following description, reference being had to the accompanying plate of drawing, is a full and exact specification of the same.

This invention consists of a flexible funnel made of India rubber, in any of its elastic vulcanizable compounds, by molding the same, as ordinarily in the manufacture of rubber articles, in a mold of suitable form to produce a funnel having a spout that is corrugated exteriorly along its length.

Figure 1:
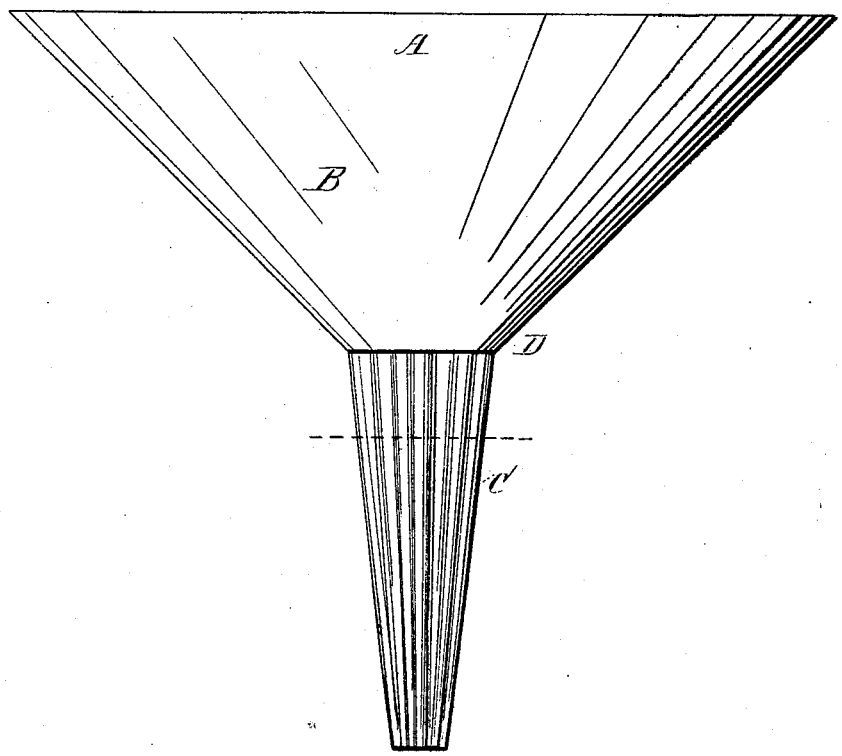
Figure 2:
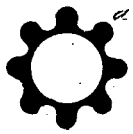

In the accompanying plate of drawing my improved funnel is illustrated, Figure 1 being a side view of the same; and Fig. 2, a cross-section in plane of line $x\ x$, Fig. 1.

A in the drawing represents the flexible funnel, to which B is the body, made of a conical shape, and C the spout or nozzle. The spout C is at the smaller end or apex D of the conical body, and it is open through its length, as well as to the body B. The spout C, along its length, and as shown in the drawing, has the exterior corrugations $a$.

The funnel A of the form above described is made of India rubber in any of its elastic vulcanizable compounds, and for its manufacture the compounded rubber is placed in a mold of a shape corresponding to the funnel described, and then vulcanized or cured as in the molding and curing of ordinary elastic India-rubber goods.

Having thus described my invention, I shall state my claim as follows:

The new article of manufacture herein described and shown, the same consisting of a flexible funnel having a corrugated spout, and made of India rubber in any of its elastic compounds.

The above specification of my improved funnel signed by me this 30th day of September, 1871.

CHAS. G. WAY.

Witnesses:
ALBERT W. BROWN,
JOHN P. MCELROY.